United States Patent
Cui

(10) Patent No.: US 11,189,010 B2
(45) Date of Patent: Nov. 30, 2021

(54) METHOD AND APPARATUS FOR IMAGE PROCESSING

(71) Applicant: Alibaba Group Holding Limited, Grand Cayman (KY)

(72) Inventor: Miaomiao Cui, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 17/134,951

(22) Filed: Dec. 28, 2020

(65) Prior Publication Data

US 2021/0256655 A1    Aug. 19, 2021

(30) Foreign Application Priority Data

Feb. 19, 2020  (CN) .................. 202010102649.X

(51) Int. Cl.
| | |
|---|---|
| *G06T 3/20* | (2006.01) |
| *G06T 11/60* | (2006.01) |
| *G06T 11/00* | (2006.01) |
| *G06T 5/50* | (2006.01) |

(52) U.S. Cl.
CPC ............ *G06T 3/20* (2013.01); *G06T 5/50* (2013.01); *G06T 11/001* (2013.01); *G06T 11/60* (2013.01)

(58) Field of Classification Search
CPC . G06T 3/20; G06T 5/50; G06T 11/001; G06T 11/60
See application file for complete search history.

(56) References Cited

U.S. PATENT DOCUMENTS

| | | | |
|---|---|---|---|
| 7,845,563 | B2 | 12/2010 | Kotlarsky et al. |
| 8,031,943 | B2 | 10/2011 | Chen et al. |
| 8,208,764 | B2 | 6/2012 | Guckenberger |
| 8,577,169 | B2 | 11/2013 | Andrus et al. |
| 8,799,756 | B2 | 8/2014 | Grosz et al. |
| 8,799,829 | B2 | 8/2014 | Grosz et al. |
| 8,806,331 | B2 | 8/2014 | Grosz et al. |
| 8,923,551 | B1 | 12/2014 | Grosz et al. |
| 8,953,905 | B2 | 2/2015 | Sandrew et al. |
| 8,970,569 | B2 | 3/2015 | Vilcovsky et al. |
| 8,982,110 | B2 | 3/2015 | Saban et al. |
| 9,058,141 | B2 | 6/2015 | Grosz |
| 9,972,100 | B2 | 5/2018 | Lu et al. |

(Continued)

*Primary Examiner* — Jennifer Mehmood
*Assistant Examiner* — Andrew Shin
(74) *Attorney, Agent, or Firm* — James J. DeCarlo; Greenberg Traurig, LLP

(57) ABSTRACT

Embodiments of the present application provide a method and an apparatus for image processing. The method includes the following steps: determining an object for adjustment in an image, the object embedded in the image; determining, based on information corresponding to the object, a target adjustment strategy from a mirror strategy and a position translation strategy; and adjusting the object in the image based on the target adjustment strategy. In the technical solutions according to the embodiments of the present application, the information of the object embedded in the image is used, so a target adjustment strategy suitable for the object is determined from the mirror strategy and the position translation strategy, and the object is adjusted in the image based on the target adjustment strategy, thereby improving the degree of automation and the effectiveness of layout modification.

14 Claims, 6 Drawing Sheets

(56) References Cited

U.S. PATENT DOCUMENTS

2016/0142609 A1     5/2016  Rolston
2017/0060817 A1*    3/2017  Dhaundiyal .............. G06T 3/20
2019/0340248 A1    11/2019  Travieso et al.
2020/0111226 A1*    4/2020  Rakesh Nattoji Rajaram .............
                                                    G06K 9/4647
2020/0193207 A1*    6/2020  Kim ........................ G06K 9/62

* cited by examiner

METHOD AND APPARATUS FOR IMAGE PROCESSING

CROSS-REFERENCE TO RELATED APPLICATIONS

This application claims the benefit of priority of Chinese Application No. 202010102649.X, filed on Feb. 19, 2020, which is hereby incorporated by reference in its entirety.

BACKGROUND

Technical Field

The present application relates to the field of computer technologies, and in particular to image processing.

Description of the Related Art

Generating a creative idea is the initial step in the drawing of a design draft (e.g., an advertising design drawing) performed by a designer. After a designer generates a creative idea, a rough design draft needs to develop into more designs to meet the diverse requirements of users. For example, on an e-commerce platform, after the designer draws up a rough draft of an advertising image template, the rough draft of the advertising image template needs to develop into multiple advertising image templates so a merchant on the e-commerce platform can select a version based on their own requirements.

However, currently available design software can only provide modification functions (e.g., layer image replacement and layer color replacement) to the designer. Such functions cannot achieve automatic modification of a layout and generally have limited modification capabilities. Therefore, the needs of designers cannot be satisfactorily met by existing technology, and a need for improved technical solutions in such software exists.

SUMMARY

In view of the above problems, the present application provides techniques for image processing to solve the above problems.

In one embodiment, a method for image processing is provided. In this embodiment, the method comprises determining an object for adjustment in an image, the object embedded in the image. The method then determines, based on information corresponding to the object, a target adjustment strategy from a mirror strategy and a position translation strategy. Finally, the method adjusts the object in the image based on the target adjustment strategy.

In another embodiment, another method for image processing is provided. In this embodiment, the method comprises displaying an image on an image processing interface and determining, in response to an adjustment event corresponding to mirror adjustment triggered by a user for the image, an object for adjustment in the image, the object embedded in the image. The method then includes determining, based on information corresponding to the object, a target adjustment strategy from a mirror strategy and a position translation strategy and adjusting the object in the image based on the target adjustment strategy. Finally, the method displays the adjusted image on the image processing interface.

In one embodiment, an electronic apparatus is provided. The apparatus comprises a memory and a processor, wherein the memory is configured to store a program and the processor is coupled to the memory and configured to execute the program stored in the memory. In this embodiment, the program can determine an object for adjustment in an image, the object embedded in the image, determine, based on information corresponding to the object, a target adjustment strategy from a mirror strategy and a position translation strategy, and adjust the object in the image based on the target adjustment strategy.

In another embodiment, an electronic apparatus is provided. The apparatus comprises a memory and a processor, wherein the memory is configured to store a program, and the processor is coupled to the memory and configured to execute the program stored in the memory. In this embodiment, the program can display an image on an image processing interface, determine, in response to an adjustment event corresponding to mirror adjustment triggered by a user for the image, an object for adjustment in the image, the object embedded in the image, determine, based on information corresponding to the object, a target adjustment strategy from a mirror strategy and a position translation strategy, adjust the object in the image based on the target adjustment strategy, and display the adjusted image on the image processing interface.

In the technical solutions according to the disclosed embodiments, information of the object embedded in the image is used, and a target adjustment strategy suitable for the object is determined from the mirror strategy and the position translation strategy. The object is then adjusted in the image based on the target adjustment strategy, thereby improving the degree of automation and the effectiveness of layout modification.

BRIEF DESCRIPTION OF THE DRAWINGS

The accompanying drawings required to be used in the embodiments are introduced below. The accompanying drawings in the following description are some embodiments of the present application. For those of ordinary skill in the art, other accompanying drawings can further be obtained according to these accompanying drawings without any significant efforts.

DETAILED DESCRIPTION

In current systems, a designer can use design software to replace images or colors of parts of layers in a rough design draft to develop more designs from the rough design draft. However, to accomplish this using existing software, the designer needs to manually perform layout modification.

However, this workload is heavy, and the operation is difficult. Therefore, the efficiency of the designer is severely affected.

The disclosed embodiments provide methods for image processing to achieve effective automatic modification of an image layout that reduces the workload of the designer and improves the working efficiency of the designer.

In order to enable those skilled in the art to better understand the solution of the present application, the technical solutions in the embodiments of the present application will be described clearly and completely with reference to the accompanying drawings in the embodiments of the present application. The described embodiments are only some of the embodiments of the present application and not all the embodiments. Based on the embodiments in the present application, all other embodiments obtained by those skilled in the art without significant efforts fall within the scope of the present application.

In addition, some processes described in the description, claims, and above accompanying drawings of the present application include a plurality of operations that appear in a specific order. These operations may be performed in an order other than that appeared herein or may be performed in parallel. Sequence numbers of the operations are only used to distinguish different operations, and the sequence numbers themselves do not represent any execution order. Additionally, these processes may include more or fewer operations, and these operations may be performed in sequence or in parallel. It should be noted that the descriptions such as "first" and "second" herein are used to distinguish between different messages, apparatuses, modules, and the like; they do not imply the precedence order or limit that the "first" and "second" are of different types.

Figure 1A:
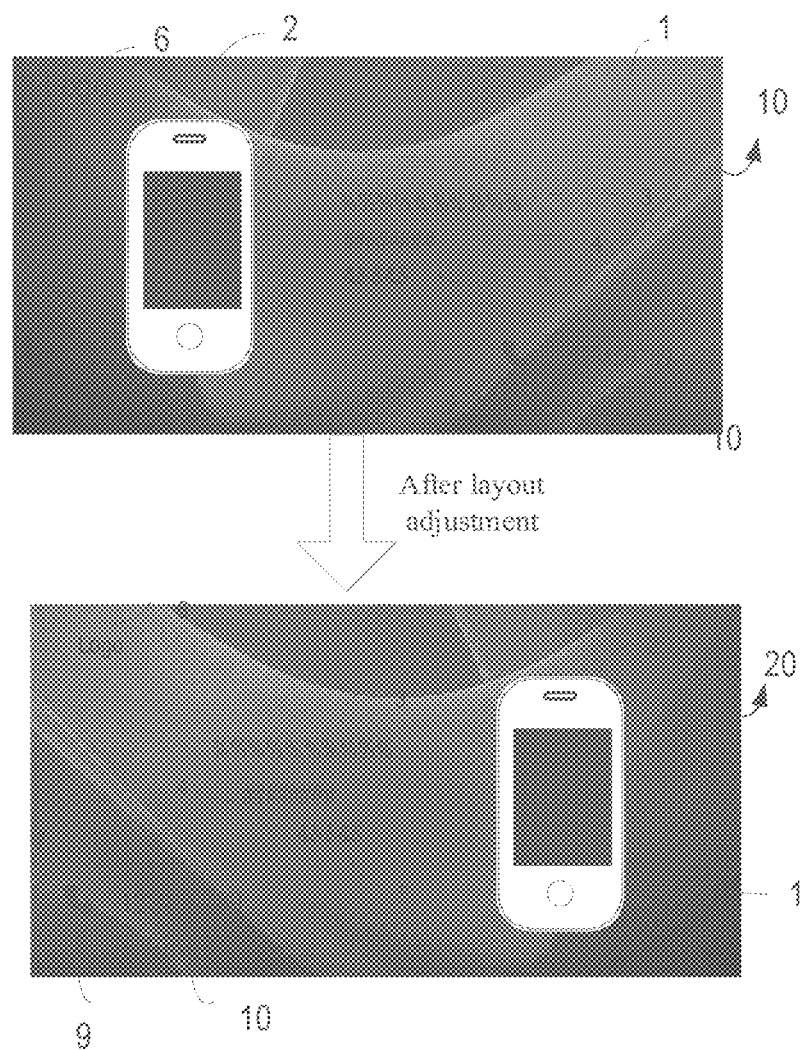
FIG. 1a is a diagram showing a layout before and after layout adjustment according to some embodiments of the disclosure.
Figure 1B:
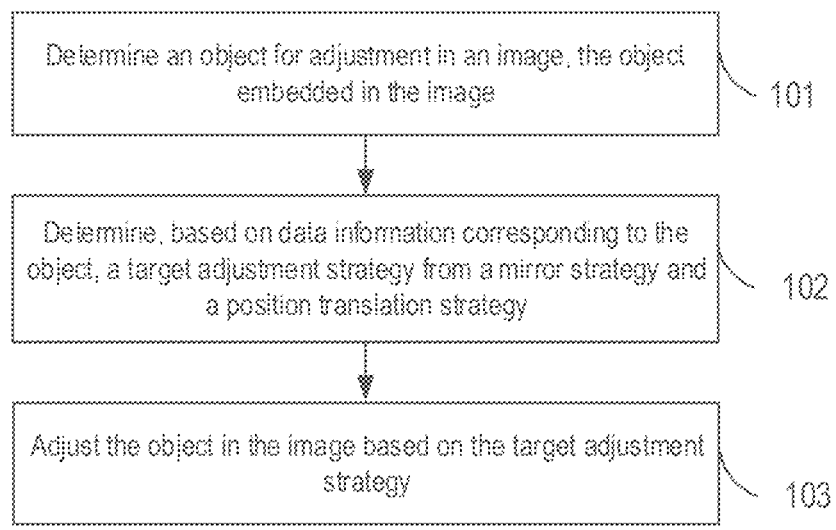
FIG. 1b is a flow diagram illustrating a method for image processing according to some embodiments of the disclosure.

FIG. 1b is a flow diagram illustrating a method for image processing according to an embodiment of the present application.

The method may be executed by a client or server. The client can comprise a hardware device having an embedded program and integrated on a terminal, or can comprise application software installed in the terminal, or may comprise tool software embedded in a terminal operating system, etc., which is not limited by the embodiments of the present application. The terminal may be any terminal apparatus, including a mobile phone, a tablet computer, a smart speaker, etc. The server may be a common server, a cloud, a virtual server, etc., which is not limited by the embodiments of the present application. As shown in FIG. 1b, the method includes the following steps.

Step 101: Determine an object for adjustment in an image, the object embedded in the image.

Step 102: Determine, based on information corresponding to the object, a target adjustment strategy from a mirror strategy and a position translation strategy.

Step 103: Adjust the object in the image based on the target adjustment strategy.

In step 101, the image may be an image in any format, which is not specifically limited in this embodiment. For example, the format may be Joint Photographic Experts Group (JPEG), PSD (a format dedicated to Adobe Photoshop®), Tag Image File Format (TIFF or TIF), Graphics Interchange Format (GIF), etc.

As one example, a plurality of objects may be embedded in the image, and an object for adjustment can be determined from the plurality of objects. Image processing algorithms such as an image semantic segmentation algorithm, a target detection algorithm, etc., can be used to determine, from the image, a plurality of objects embedded in the image. Specific implementations of the image processing algorithm to detect objects are not described herein.

In step 102, the information corresponding to the object may include a type and/or content identification information. The type can be understood as a function type. For example, in an advertising design drawing, the function types may include at least one of the following: a background type, a product type, a copywriting type, a character type, a modification type, a brand/logo type, etc. The modification type can further be subdivided into a product modification type, a character modification type, and a copywriting modification type. The content identification information can comprise a content tag. For example, if the object is a character, then the content tag thereof is a person; if the object is a tree, then the content tag thereof is a tree; if the object is copywriting, then the content tag thereof is text.

A target adjustment strategy is determined, based on the information corresponding to the object, from the mirror strategy and the position translation strategy. In general, certain objects are not suitable for mirror processing. If mirror processing is performed on these objects, then the fundamental message represented by the image is rendered unclear. These objects include, for example, text, a brand logo, a product, a character, etc. The reasons why the product is not suitable for mirroring are as follows: the structure of the product is likely to be in non-mirror symmetry, and the product is likely to be printed with text or a brand logo. The reasons why the character is not suitable for mirroring are as follows: clothes worn by the character are likely to be in non-mirror symmetry, and the clothes are likely to be printed with text or a brand logo. Therefore, in an achievable solution, step 102 can be implemented via the following sub-steps.

Step 1021: Determine, based on the information corresponding to the object, whether the object meets a mirror condition.

Step 1022: If not, determining that the target adjustment strategy is the position translation strategy.

Step 1021 can be implemented by one or a plurality of the following methods.

In a first method, the method determines, based on the type in the information, whether the object meets the mirror condition, wherein the mirror condition includes all of types that can be subjected to mirroring (e.g., a background type, a text modification type, a product modification type, and a character modification type). For example, if the type is the copywriting type, the character type, or the product type, then it can be determined that the object does not meet the mirror condition; for another example, if the type is the background type, the text modification type, the product modification type, or the character modification type, then it can be determined that the object meets the mirror condition.

In a second method, the method determines, based on the type and the content identification information in the information, whether the object meets the mirror condition, wherein the mirror condition includes a first mirror condition and a second mirror condition; the first mirror condition includes all of types that can be subjected to mirroring, and the second mirror condition includes all of content tags that can be subjected to mirroring; and the object of which the type meets the first mirror condition and of which the content identification information meets the second mirror condition is an object meeting the mirror condition.

In the section method, a determination is performed based on both the type and the content identification information, thereby reducing the possibility of false determination. For example, for an object serving as a text modification including text, the type thereof being the text modification type, and the content identification information thereof being text, if determination is performed by referring only to the type, then it would be falsely determined that the object meets the mirror condition, and if determination is performed based on both the type and the content identification information, then it would be correctly determined that the object does not meet the mirror condition.

In step 1022, if the object does not meet the mirror condition, it is determined that the target adjustment strategy is the position translation strategy.

Returning to step 102, in some embodiments, step 102 may further include sub-step 1023, wherein if the object meets the mirror condition, the method determines that the target adjustment strategy is the mirror strategy.

In step 103, the object in the image is adjusted based on the target adjustment strategy. If the target adjustment strategy is the position translation strategy, position translation processing is performed on the object in the image. Position translation processing refers to translating the whole object from the current position region to a designated position region. After position translation, displacement of each pixel on the object has the same direction and magnitude. The designated position region can be determined automatically, or can be determined based on a region selected by a user (e.g., the designer). That is, the region selected by the user for the object is used as the designated position region. The user can select a suitable region for the object based on actual requirements as the designated position region. Specific implementation of automatic determination of the designated position region will be described in detail in the following embodiments. In order to facilitate subsequent processing, the current position region of the object may specifically be a bounding box region binding the object.

If the target adjustment strategy is the mirror strategy, mirror processing is performed on the object in the image. Mirror processing specifically refers to performing mirror processing on the object in reference to a mirror center of the image. A distance between each pixel on the object and the mirror center of the image is equal before and after been subjected to mirroring. The mirror center of the image may be a vertical central axis, a horizontal central axis, or an intersection of the vertical central axis and the horizontal central axis of the image. It should be noted that if the mirror center of the image is the vertical central axis of the image, the foregoing mirror processing is specifically horizontal mirror processing. If the mirror center of the image is the horizontal central axis of the image, the foregoing mirror processing is specifically vertical mirror processing. If the mirror center of the image is the intersection of the horizontal central axis and the vertical central axis of the image, the foregoing mirror processing is specifically diagonal mirror processing, that is, horizontal mirroring and vertical mirroring are performed sequentially. Both the vertical central axis and the horizontal central axis of the image pass through a geometric center of the image.

In practical applications, target adjustment strategies respectively corresponding to all objects for adjustment in the image can be determined, and then each object is adjusted in the image based on the target adjustment strategy corresponding thereto to automatically update a layout to acquire an updated image.

In the technical solutions according to the embodiments of the present application, the information of the object embedded in the image is used, so a target adjustment strategy suitable for the object is determined from the mirror strategy and the position translation strategy, and the object is adjusted in the image based on the target adjustment strategy, thereby improving the degree of automation and the effectiveness of layout modification.

In some embodiments, adjusting the object in the image based on the target adjustment strategy in step 103 includes the following step 1031.

Step 1031: Translate, based on the position translation strategy and in the image, the object from a current position region thereof to a symmetrical position region thereof in reference to a mirror center of the image if the target adjustment strategy is the position translation strategy.

For description of the mirror center of the image, please refer to corresponding disclosure in the above embodiments. As one example, the mirror center of the image may specifically be the vertical central axis of the image.

In step 1031, the current position region of the object may be determined and represented by a region width, a region height, and region designated point coordinates. The designated point may be the geometric center or upper left corner coordinates of the object. The region width and the region height are determined by the width and the height of the object. Specifically, the region width is equal to the width of the object, and the region height is equal to the height of the object.

The position region symmetric to the current position region of the object in reference to the mirror center of the image can be calculated based on the current position region of the object in the image, that is, the region width, the region height, and the designated point coordinates used to represent the symmetrical position region are calculated.

The scenario in which the mirror center of the image is the vertical central axis of the image and the designated point coordinates are the upper left corner coordinates is taken as an example to describe a calculation process of the symmetrical position region in detail.

The following assumptions are made: the image has a width of bgw and a height of bgh, and the current position region of the object has a region width of w, a region height of h, and upper left corner coordinates of (x, y), wherein the current position region of the object is a bounding box region binding the object, and the upper left corner coordinates are specifically upper left corner coordinates of the bounding box region. Therefore, the symmetrical position region also has a region width of w, also has a region height of h, and has upper left corner coordinates of (bgw-x-w, y). It should be noted that since the mirror center is the vertical central axis of the image, the value of y remains unchanged.

After the position region symmetric to the current position region of the object in reference to the mirror center of the image is acquired by means of calculation, the whole object is translated from the current position region thereof to the symmetrical position region thereof in reference to a first mirror symmetry axis.

Optionally, adjusting the object in the image based on the target adjustment strategy in step 103 may further specifically include the following step.

Step 1032: Perform, based on the mirror strategy, mirror processing on the object in the image in reference to the mirror center of the image if the target adjustment strategy is the mirror strategy.

The mirror processing can comprise determining pixel coordinates symmetric to pixel coordinates of each pixel on the object in reference to the mirror center of the image, and then moving each pixel on the object to corresponding symmetrical pixel coordinates to complete the mirror processing on the object in reference to the mirror center of the image. As one example, the mirror center of the image may specifically be the vertical central axis of the image.

In practical applications, a plurality of image elements is generally embedded in the image, and the image elements may include at least one of the following: copywriting, a copywriting modification, a product, a product modification, a character, a character modification, a brand logo, a background, etc. The copywriting modification is used to modify copywriting, for example, a phone icon (namely, the copywriting modification) is used to modify phone number copywriting. The product modification is used to modify a product, such as a tiled modification (namely, the product modification) provided around the product in order to display the product in the image in a highlighted manner. The character modification is used to modify a character. Shapes of the copywriting modification, the product modification, and the character modification may vary, and can be specifically designed based on actual requirements, which is not specifically limited by the embodiments of the present application. The foregoing object may be a single image element, or may be a combination of a plurality of image elements. Correspondingly, types of the image elements may include at least one of the following: a copywriting type, a copywriting modification type, a product type, a product modification type, a character type, a character modification type, a brand/logo type, and a background type.

In general, there are image elements having relative modification relationships in some images. For example, there is a relative modification relationship between a product and a product modification modifying the product; there is a relative modification relationship between copywriting and a copywriting modification modifying the copywriting; and there is a relative modification relationship between a character and a character modification modifying the character. Relative positional relationships between some image elements having relative modification relationships cannot be changed, and otherwise an unreasonable situation occurs. For example, the phone icon is used to modify the phone number copywriting, and is generally provided on the left side of the phone number copywriting; after mirror processing, a phone image is located on the right side of the phone number copywriting, and this situation is unreasonable. Therefore, in practical applications, a plurality of image elements can be combined to acquire a combined object, and then position translation processing is performed on the whole combined object to ensure that a relative positional relationship between the plurality of image elements remains unchanged. Therefore, determining, based on the information corresponding to the object, whether the object meets a mirror condition in step 1021 can be specifically implemented by the following steps.

Step S11: Determine, based on the information corresponding to the object, whether the object is a combined object consisting of a plurality of image elements.

Step S12: If so, determining that the object does not meet the mirror condition.

In S11, the information corresponding to the object includes a type and/or content identification information of each image element of which the object consists. The information corresponding to the object may further include style identification information of each image element of which the object consists. The style identification information is a style tag, such as ink painting, simplicity, luxury, cuteness, etc. It is determined, based on the information corresponding to the object, whether the object is a combined object consisting of a plurality of image elements.

In S12, if the object is a combined object, it is determined that the object does not meet the mirror condition. Optionally, "determining, based on the information corresponding to the object, whether the object meets a mirror condition" in step 1021 may further specifically include the following step.

Step S13: Determine, based on the information, whether the object meets the mirror condition if the object is a non-combined object.

The information comprises a type and/or content identification information of a single image element in the object. S13 can be implemented by one or a plurality of the following methods:

In a first method, step S13 can comprise determining, based on the type of a single image element in the object, whether the object meets the mirror condition, wherein the mirror condition includes all of types that can be subjected to mirroring (e.g., a background type, a text modification type, a product modification type, and a character modification type). For example, if the type is the copywriting type, the character type, or the product type, then it can be determined that the object does not meet the mirror condition; for another example, if the type is the background type, the text modification type, the product modification type, or the character modification type, then it can be determined that the object meets the mirror condition.

In a second method, step S13 can comprise determining, based on the type and the content identification information of the single image element in the object, whether the object meets the mirror condition, wherein the mirror condition includes a first mirror condition and a second mirror condition; the first mirror condition includes all of types that can be subjected to mirroring, and the second mirror condition includes all of content tags that can be subjected to mirroring; and the object of which the type meets the first mirror condition and of which the content identification information meets the second mirror condition is an object meeting the mirror condition.

In the second method, a determination is performed based on both the type and the content identification information, thereby reducing the possibility of false determination. For example, for an object serving as a text modification including text, the type thereof being the text modification type, and the content identification information thereof being text, if determination is performed by referring only to the type, then it would be falsely determined that the object meets the mirror condition, and if determination is performed based on both the type and the content identification information, then it would be correctly determined that the object does not meet the mirror condition.

In some embodiments, determining an object for adjustment in an image, the object embedded in the image in step 101 may specifically include at least one of the following steps.

Step 1011: Combine a plurality of image elements correlating with each other in the image to acquire the object; and Step 1012: Determine a single image element not correlating with any other image element in the image to be the object.

In step 1011, as one example, the correlation between the plurality of image elements may be established in response to a correlation operation performed by the user for the plurality of image elements. For example, the establishment is as follows: displaying the image on a user interface; determining a plurality of image elements selected by the user in the image in response to a selection operation performed by the user; establishing and storing a correlation between the plurality of image elements in response to a trigger operation performed by the user on an establishment control on the user interface.

In another example, the correlation can be determined by the following steps.

Step 104: Acquire regional position information and a type of each image element in the image.

Step 105: Determine, based on the regional position information and the type of each image element, that a plurality of image elements of types corresponding to each other and of position regions corresponding to each other to be correlated with each other.

In step 104, the regional position information of the image element may include: a region width, a region height, and designated point coordinates of a region occupied by the image element. The designated point coordinates may be geometric center coordinates or upper left corner coordinates of the region occupied by the image element. The region occupied by the image element may specifically be a bounding box region binding the image element.

The types of the image elements in the image may include at least one of a copywriting type, a copywriting modification type, a product type, a product modification type, a character type, a character modification type, a brand/logo type, and a background type. Each type corresponds to the type itself. In addition, the copywriting type corresponds to the copywriting modification type; the product type corresponds to the product modification type; and the character type corresponds to the character modification type. For example, a type of each image in any two images of types corresponding to each other may be either of the copywriting type and the copywriting modification type, or either of the product type and the product modification type, or either of the character type and the character modification type.

The position regions corresponding to each other refers to that regions occupied by the image elements are adjacent to or intersect with each other. In the present application, when a distance between regions is less than a first preset distance, it is determined that the regions are adjacent to each other. When an overlapping region between regions has an area greater than a first preset area, it is considered that the regions intersect with each other.

As one example, determining, based on the regional position information and the type of each image element, a plurality of image elements of types corresponding to each other and of position regions corresponding to each other to be correlated with each other in step 105 can be specifically implemented by the following steps.

Step 1051: Determine a first image element of the copywriting type from the image elements in the first image;

Step 1052: Determine an initial first region based on a position region of the first image element in the image.

Step 1053: Search the image for an image element adjacent to or intersecting with the first region and a type thereof corresponding to the copywriting type.

Step 1054: Determining the image element adjacent to or intersecting with the first region and the type thereof corresponding to the copywriting type to be correlated with the first image element after one is found.

In step 1052, the current position region of the first image element in the image can be used as the initial first region.

In step 1053, types corresponding to the copywriting type include the copywriting type and the copywriting modification type. The type of the image element adjacent to or intersecting with the first region and the type thereof corresponding to the copywriting type is the copywriting type or the copywriting modification type, and a position region of the image element adjacent to or intersecting with the first region and the type thereof corresponding to the copywriting type in the image is adjacent to or intersects with the first region.

In some embodiments, determining, based on the regional position information and the type of each image element, a plurality of image elements of types corresponding to each other and of position regions corresponding to each other to be correlated with each other in step 105 may further include the following step.

Step 1054: Determine, based on the position of the image element adjacent to or intersecting with the first region and the type thereof corresponding to the copywriting type, and the position of the first region, a new first region until no image element adjacent to or intersecting with the new first region and a type thereof corresponding to the copywriting type is found.

Correspondingly, determining the image element adjacent to or intersecting with the first region and the type thereof corresponding to the copywriting type to be correlated with the first image element in step 1053 specifically refers to determining a plurality of image elements finally acquired and included in the first region to be correlated with each other.

The foregoing iterative steps can reasonably find a plurality of image elements correlated with each other.

As one example, in step 1012, if no image element adjacent to or intersecting with the first region and corresponding to the copywriting type is found by the foregoing method, then it is determined that the first image element does not correlate with any other image element. The first image element is determined to be the object.

For example, in an advertising image, a brand logo is generally located in an upper left region of the image. After layout modification, if the brand logo is moved to an upper right region of the image, then an unreasonable situation occurs. Therefore, in actual applications, image elements such as brand logos do not need to be subjected to any processing, that is, such image elements do not need to be subjected to mirror processing nor position translation processing. Therefore, the above method may further include the following steps 106 through 107.

Step 106: Determine, from the image, an image element not meeting the mirror condition nor a position translation condition.

Step 107: Determine an image element other than the image element not meeting the mirror condition nor the position translation condition in the image to be an image to be processed.

In step 106, at least one type not meeting the mirror condition nor the position translation condition can be defined in advance. For example, in the advertising image, the brand/logo type can be determined to be a type not meeting the mirror condition nor the position translation condition.

As one example, when the image is an image consisting of a plurality of layers (e.g., an image in PSD format), the image elements are specifically layers. Correspondingly, types of the layers may include, but are not limited to: a copywriting type, a copywriting modification type, a product type, a product modification type, a character type, a character modification type, a brand/logo type, and a background type. In actual applications, the above method may further include the following step 108.

Step 108: Perform layer analysis on the image to acquire each layer in the image, and respectively use the layers as the image elements, the layers embedded in the image.

Specific techniques for performing a layer analysis are not described herein. In the illustrated embodiments, the image is specifically in PSD format.

As one example, if the object is a combined object, in order to further optimize the layout, after adjusting the object in the image based on the target adjustment strategy, the method may further include steps 109 and 110.

Step 109: Determine whether there is an image element of the copywriting modification type in the object.

Step 110: Translate, in the interior of the object, each image element in the object from the current position region thereof to a symmetrical position region thereof in reference to a mirror center of the object respectively if there is no image element of the copywriting modification type in the object.

In step 109, it can be determined, based on the information corresponding to the object, whether there is an image element of the copywriting modification type in the object.

In step 110, if there is no image element of the copywriting modification type in the object, it is indicated that all of the types of the image elements in the object are the copywriting type.

The mirror center of the object may specifically be a vertical central axis, a horizontal central axis, or an intersection of the vertical central axis and the horizontal central axis of the object. As one example, the mirror center of the object may specifically be the vertical central axis of the object. The vertical central axis and the horizontal central axis of the object pass through a geometric center of the object.

Each whole image element in the object is respectively translated from the current position region thereof to the symmetrical position region thereof in reference to the mirror center of the object.

The current position region of the image element may specifically be a bounding box region binding the image element.

Optionally, after adjusting the object in the image based on the target adjustment strategy, the method may further include steps 111 and 112.

Step 111: Determine whether there is an image element of the copywriting type having a first specific positional relationship with the image element of the copywriting modification type in the object if there is an image element of the copywriting modification type in the object; and Step 112: If not, translating each image element of a text type and each image element of a text modification type not meeting the mirror condition in the object from the current position region thereof to a symmetrical position region thereof in reference to the mirror center of the object respectively, and performing, in reference to the mirror center of the object, mirroring operation on each image element of the text modification type meeting the mirror condition in the object.

In step 111, the first specific positional relationship can be configured based on actual requirements. For example, when the mirror center of the image is the vertical central axis of the image, and when the mirror center of the object is the vertical central axis of the object, the first specific positional relationship may specifically be a left-right positional relationship. In actual applications, a relationship between a phone icon (namely, the image element of the copywriting modification type) and phone number copywriting (namely, the image element of the copywriting type) in an advertising image is the left-right positional relationship, and a relationship between an address icon (namely, the image element of the copywriting modification type) and address information copywriting (namely, the image element of the copywriting type) in the advertising image is also the left-right positional relationship.

In step 112, if there is no image element of the copywriting type having the first specific positional relationship with the image element of the copywriting modification type in the object, it can be determined, based on content identification information of each image element of the text modification type in the object, whether each text modification type meets the mirror condition; then, each image element of the text type and each image element of the text modification type not meeting the mirror condition in the object are separately translated from the current position region thereof to the symmetrical position region thereof in reference to the mirror center of the object, and mirror processing is performed, in reference to the mirror center of the object, on each image element of the text modification type meeting the mirror condition in the object.

Optionally, after the adjusting the object in the image based on the target adjustment strategy, the method may further include steps 113 and 114.

Step 113: Grouping the image element of the copywriting type and the image element of the copywriting modification type in the object having the first specific positional relationship therebetween into an element group if there is an image element of the copywriting type having the first specific positional relationship with the image element of the copywriting modification type in the object.

Step 114: Translate the whole element group from a current position region thereof to a symmetrical position region thereof in reference to the mirror center of the object, separately translate each image element of the text type and each image element of the text modification type not meeting the mirror condition among remaining image elements in the object from a current position region thereof to a symmetrical position region thereof in reference to the mirror center of the object, and perform, in reference to the mirror center of the object, mirror processing on each image element of the text modification type meeting the mirror condition among the remaining image elements.

In step 113, for example, the phone icon and the phone number copywriting are grouped into an element group, and the address icon and the address information copywriting are grouped into an element group.

In step 114, each whole element group are separately translated from the current position region thereof to the symmetrical position region thereof in reference to the mirror center of the object. The remaining image elements in the object refer to image elements other than the element groups in the object. It can be determined, based on content identification information of each image element of the copywriting modification type in the remaining image elements, whether each image element of the copywriting modification type meets the mirror condition.

In actual applications, it can be further determined whether there are element groups having a second specific positional relationship therebetween in the object. If not, then step 114 is performed, and if so, then steps 115 and 116 described below are performed. The second specific positional relationship may specifically be a left-aligned positional relationship or a right-aligned positional relationship.

Step 115: Cause the element groups having the second specific positional relationship therebetween to form an element group cluster; and Step 116: translate the whole element group cluster from a current position region thereof to a symmetrical position region thereof in reference to the mirror center of the object, separately translate each whole remaining element group from a current position region thereof to a symmetrical position region thereof in reference to the mirror center of the object, separately translate each image element of the text type and each image element of the text modification type not meeting the mirror condition among the remaining image elements in the object from a current position region thereof to a symmetrical position region thereof in reference to the mirror center of the object, and perform, in reference to the mirror center of the object, mirror processing on each image element of the text modification type meeting the mirror condition among the remaining image elements. The remaining image elements refer to image elements other than the element groups.

As one example, the information includes the type of each image element in the object. The above method may further include steps 117 and 118.

Step 117: Input each image element in the image into a trained image identification model to acquire an identification result of each image element; and Step 118: Determine the type of each image element with reference to the identification result.

In step 117, the image element may specifically be a layer, and each layer in the image is inputted into the trained image identification model to acquire an identification result of each layer.

The identification result can include a layer type and content identification information corresponding to each image element.

In a training process, type tagging and/or content tagging can be performed on each image element in a sample image, and the tagged sample image is used to train the image identification model. For the specific implementation and the training process of the image identification model, please refer to the prior art, and details are not described herein.

In step 118, the type of each image element can be determined based on the identification result. Generally, the image identification model can recognize the copywriting type, the product type, the brand/logo type, the background type, and the character type. In addition, the image identification model uniformly recognizes the character modification type, the product modification type, and the copywriting modification type as modification types. In order to improve accuracy, the type of each image element can be determined based on the identification result and position region information of each image element in the image. For example, when the identification result indicates that the type of a certain image element is the modification type, a specific type of the image element can be determined based on both the position region information of each image element in the image and the identification results of other image elements in the image. For example, if it is determined, based on the position region information of each image element and the identification results of other image elements, that the image element is adjacent to or intersects with the image element of the copywriting type, then it can be determined that the specific type of the image element is the copywriting modification type.

In actual applications, the image may be an editable design drawing template. In this case, it is convenient for the user (e.g., the merchant) to perform edition such as text input, image import, color filling, etc. in the design drawing template based on actual requirements. Layout adjustment is performed on the design drawing template to acquire a new design drawing template to meet the requirements of the user for diverse selection.

As one example, the image may specifically be a commercial advertising image. Generally, commercial feature information is written in the commercial advertising image. In order to meet the requirements of the user for displaying the commercial feature information in a highlighted manner, after the adjusting the object, the above method may further include steps 119 through 121.

Step 119: Identify the object to acquire text content in the object if the object corresponds to copywriting;

Step 120: Determine whether the text content is a commercial marketing term; and Step 121: If so, displaying the object on the image in a highlighted manner.

In step 119, the text content can be acquired from the object by means of image text identification technology such as Optical Character identification (OCR).

In step 120, semantic understanding is performed on the text content by means of Natural Language Processing (NLP) technology, and it is determined, based on a semantic understanding result, whether the text content is a commercial marketing term.

Alternatively, matching is performed on the text content in a commercial marketing term library, and it is determined, based on a matching result, whether the text content is a commercial marketing term. The commercial marketing term library includes a plurality of commercial marketing terms. Matching between the text content and the plurality of commercial marketing terms in the commercial marketing term library can be performed. If a matching degree between the text content and a commercial marketing term in the commercial marketing term library is greater than a preset matching degree threshold, then it is determined that the text content is a commercial marketing term.

In step 121, displaying the object on the image in a highlighted manner is specifically implemented by one of the following methods.

In a first method, in step 121, the method can enlarge the object. The size of the enlarged object can be determined based on an actual situation. For example, the size of the enlarged object is determined based on a region position of at least one first object not overlapping with the object and located around the object. In this case, the enlarged object is prevented from being covered by the at least one first object, or the at least one first object is prevented from being covered by the enlarged object.

In a second method, in step 121, the method can, translate the object to a conspicuous position in the image. Specifically, the conspicuous position can be determined based on a region position of at least one second object other than the object in the image not overlapping with the object to ensure that the object does not overlap with the at least one second object after the object is translated to the conspicuous position in the image. That is, it is ensured that after the object is translated to the conspicuous position in the image, the object is not covered by the at least one second object or the at least one first object is not covered by the object.

In actual applications, the image serves as a page object, and is displayed on a page. The page further includes other page objects as well as the image. These other page objects are likely to have a certain correlation with a certain object in the image. Once the object in the image is adjusted, this correlation is destroyed, and a display effect of this page is affected. Therefore, determining an object for adjustment in an image, the object embedded in the image in step 101 can comprise acquiring other page objects in a page in which the image is located, and determining, based on the other page objects, an object for adjustment from a plurality of objects embedded in the image.

A correlation between the other page objects and each object embedded in the image can be acquired by means of identification. As one example, the correlation may specifically be a semantic correlation, and it is determined, based on semantic understanding results of the other page objects and each object in the image, whether there is a correlation between the other page objects and each object embedded in the image. An object in the image not correlating with any other page object is determined to be the object for adjustment, and an object in the image correlating with the other page objects is determined to be an object not for adjustment.

The technical solutions according to the embodiments of the present application will be described in detail below with reference to FIG. 1a.

In FIG. 1a, an image 10 includes image elements such as a background 1, a product 2, first copywriting 3, second copywriting 4, third copywriting 5, a brand logo 6, a first copywriting modification 7 (namely, a phone icon), fourth copywriting 8 (namely, phone number copywriting), a second copywriting modification 9 (namely, an address icon), fifth copywriting 10 (namely, address information copywriting), etc.

Step A: Input each image element in the image 10 into a trained image identification model to perform identification to acquire an identification result, the identification result including a type and a content tag of each image element.

Step B: determine, based on the type and the content tag of each image element, that an image element in the image 10 not meeting a mirror condition nor a position translation condition is the brand logo 6. An image element other than the brand logo 6 in the image 10 is determined to be an image to be processed.

Step C: Determine, based on the iteration steps in the foregoing embodiments, that the first copywriting 3, the second copywriting 4, and the third copywriting 5 correlate with each other to combine the first copywriting 3, the second copywriting 4, and the third copywriting 5 into a first object; determine, based on the iteration steps in the foregoing embodiments, that the first copywriting modification 7 (namely, the phone icon), the fourth copywriting 8 (namely, the phone number copywriting), the second copywriting modification 9 (namely, the address icon), and the fifth copywriting 10 (namely, the address information copywriting) correlate with each other to combine the first copywriting modification 7 (namely, the phone icon), the fourth copywriting 8 (namely, the phone number copywriting), the second copywriting modification 9 (namely, the address icon), and the fifth copywriting 10 (namely, the address information copywriting) into a second object; and determine, based on the iteration steps in the foregoing embodiments, that the background 1 and the product 2 are single images not correlating with any other image element to determine the background 1 to be a third object and to determine the product 2 to be a fourth object.

Step D: Determine, based on information corresponding to each object, that both the first object and the second object are combined objects to determine that the first object and the second object do not meet the mirror condition and that the third object meets the mirror condition and the fourth object does not meet the mirror condition.

Step E: do not make any adjustment to the brand logo 6; translate the first object from a current position region thereof to a symmetrical position region thereof in reference to a vertical central axis of the image 10; translate the second object from a current position region thereof to a symmetrical position region thereof in reference to the vertical central axis of the image 10; perform mirror processing on the third object in reference to the vertical central axis of the image 10; and translate the fourth object from a current position region thereof to a symmetrical position region thereof in reference to the vertical central axis of the image 10.

After Step E, the following steps may further be performed.

Step F: If it is determined that there is no image element of a copywriting modification type in the first object, translate each image element in the first object from a current position region thereof to a symmetrical position region thereof in reference to a vertical central axis of the object.

Step G: After it is determined that there is an image element of the copywriting modification type (namely, the phone icon and the address icon) in the second object, it is further determined that the first copywriting modification 7 (namely, the phone icon) and the fourth copywriting 8 (namely, the phone number copywriting) in the second object have a left-right positional relationship therebetween and that the second copywriting modification 9 (namely, the address icon) and the fifth copywriting 10 (namely, the address information copywriting) also have a left-right positional relationship therebetween to group the first copywriting modification 7 (namely, the phone icon) and the fourth copywriting 8 (namely, the phone number copywriting) into a first element group and to group the second copywriting modification 9 (namely, the address icon) and the fifth copywriting 10 (namely, the address information copywriting) into a second element group.

Step H: After it is determined that the first element group and the second element group in the second object have a left-aligned positional relationship therebetween, cause the first element group and the second element group to form an element group cluster.

Step I: Translate the whole element group cluster from a current position region thereof to a symmetrical position region thereof in reference to the vertical central axis of the object.

Since there is no other remaining image element in the second object, the adjustment can be ended, and a final target image 20 is acquired.

In conclusion, the technical solutions according to the embodiments of the present application apply image mirroring to the field of design of structured images (e.g., an image having a layer structure), thereby improving design efficiency. Since a simple mirror algorithm is simple and common but leads to a plurality of unreasonable situations, the technical solutions according to the embodiments of the present application introduce an optimization strategy in which part of mirror strategies are blocked based on content identification information (namely, semantic information) and a function type of a layer image to achieve targeted layout expansion and optimization, thereby improving an adoption rate from 10% to 60%.

Figure 2:
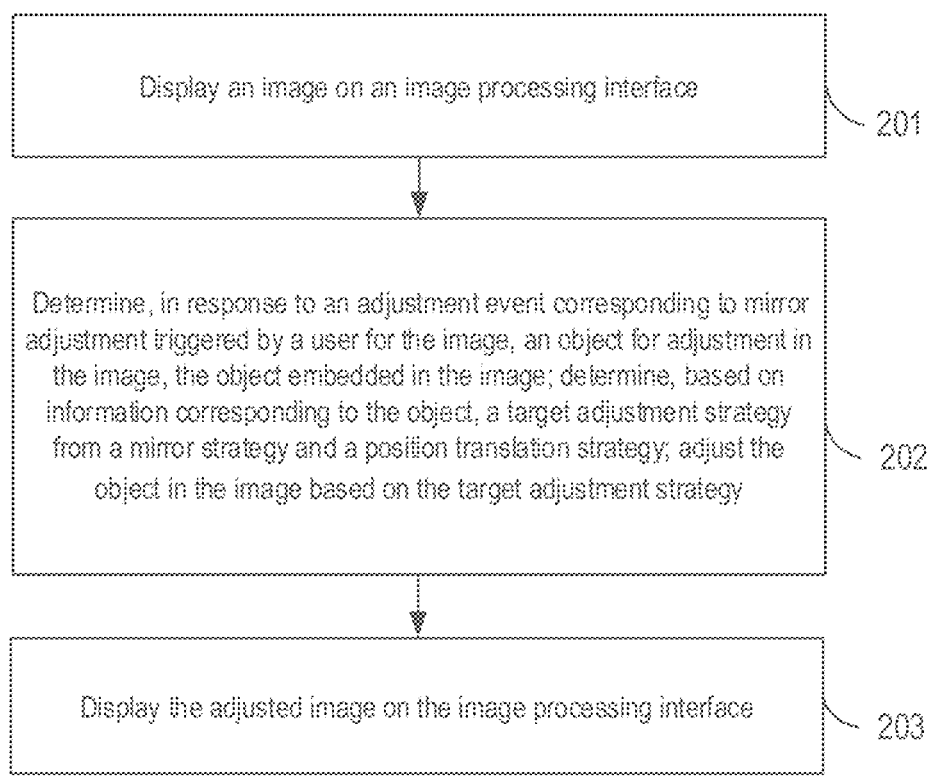
FIG. 2 is a flow diagram illustrating a method for image processing according to some embodiments of the disclosure.

FIG. 2 is a flow diagram illustrating a method for image processing according to still another embodiment of the present application.

In one embodiment, the method of FIG. 2 is executed by a client. The client can comprise a hardware device having an embedded program and integrated on a terminal, or can comprise application software installed in the terminal, or may comprise tool software embedded in a terminal operating system, etc., which is not limited by the embodiments of the present application. The terminal may be any terminal apparatus including a mobile phone, a tablet computer, a smart speaker, etc. As shown in FIG. 2, the method includes the following steps.

Step 201: Display an image on an image processing interface.

Step 202: Determine, in response to an adjustment event corresponding to mirror adjustment triggered by a user for the image, an object for adjustment in the image, the object embedded in the image; determine, based on information corresponding to the object, a target adjustment strategy from a mirror strategy and a position translation strategy; adjust the object in the image based on the target adjustment strategy.

Step 203: Display the adjusted image on the image processing interface.

In step 201, the image can be acquired by means of searching based on a search keyword inputted by the user, and then the image is displayed on the image processing interface.

As one example, a plurality of images is likely to be acquired by means of searching based on the search keyword inputted by the user, and the plurality of images can be displayed on the image processing interface so the user can select the same. Therefore, "displaying an image on an image processing interface" in step 201 can be specifically implemented by the following steps 2011 and 2012.

Step 2011: Display, on the image processing interface, a plurality of images for the user to select; and Step 2012: Determine, in response to a selection operation of the user, the image from the plurality of images.

In step 202, a trigger control corresponding to mirror adjustment can be displayed on the image processing interface. The foregoing adjustment event is generated in response to a trigger operation performed by the user on the trigger control.

For the processing process in step 202, reference can be made to the corresponding content in the foregoing embodiments, and details are not repeated herein.

In step 203, the non-adjusted image and the adjusted image may be displayed side by side on the image processing interface. Alternatively, the adjusted image may be displayed on the image processing interface by replacing the non-adjusted image with the adjusted image. Configurations can be made based on actual requirements, which is not specifically limited in this embodiment of the present application.

It should be noted herein that for content of the method that is not fully detailed in the steps provided in this embodiment of the present application, reference can be made to the corresponding content in the above embodiments, and details are not repeated herein. Moreover, in addition to the above steps, the method according to this embodiment of the present application may also include other parts or all of the steps in the above embodiments. For specific details, reference can be made to the corresponding content of the above embodiments, and details are not repeated herein.

Figure 3:
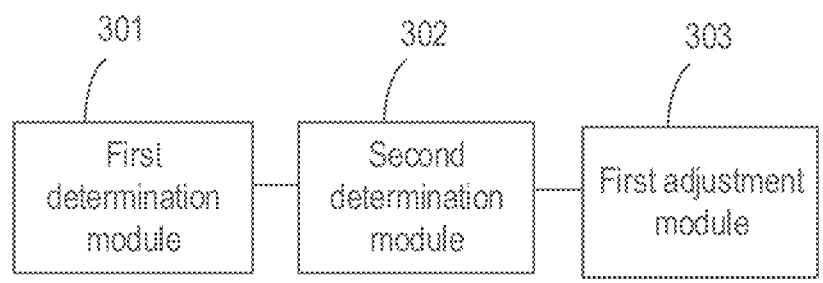
FIG. 3 is a block diagram of a device for image processing according to some embodiments of the disclosure.

FIG. 3 is a block diagram of an electronic apparatus according to some embodiments of the disclosure. As shown in FIG. 3, the device includes the following modules.

A first determination module 301 is configured to determine an object for adjustment in an image, the object embedded in the image.

A second determination module 302 is configured to determine, based on information corresponding to the object, a target adjustment strategy from a mirror strategy and a position translation strategy.

A first adjustment module 302 is configured to adjust the object in the image based on the target adjustment strategy.

Optionally, the above device may further include a third and fourth determination module. In one embodiment, the third determination module is configured to determine, from the image, an image element not meeting the mirror condition nor a position translation condition. Alternatively, or in conjunction with the foregoing, the fourth determination module is configured to determine an image element other than the image element not meeting the mirror condition nor the position translation condition in the image to be an image to be processed.

Optionally, the above device may further include a first analysis module, configured to perform layer analysis on the image to acquire each layer in the image and respectively use the layers as the image elements, the layers embedded in the image.

Optionally, the above device may further include a first acquisition module, configured to acquire regional position information and a type of each image element in the image; and a fifth determination module, configured to determine, based on the regional position information and the type of each image element, a plurality of image elements of types corresponding to each other and of position regions corresponding to each other to be correlated with each other.

Optionally, the above device may further include a first judgment module, configured to: determine whether there is an image element of a copywriting modification type in the object if the object is a combined object and after adjusting the object in the image based on the target adjustment strategy; and a second adjustment module, configured to: translate each image element in the object from a current position region thereof to a symmetrical position region thereof in reference to a mirror center of the object respectively if there is no image element of the copywriting modification type in the object.

Optionally, the first judgment module is further configured to: if there is an image element of the copywriting modification type in the object, determine whether there is an image element of a copywriting type having a first specific positional relationship with the image element of the copywriting modification type in the object.

The first adjustment module is further configured to: translate each image element of a text type and each image element of a text modification type not meeting the mirror condition in the object from a current position region thereof to a symmetrical position region thereof in reference to the mirror center of the object respectively if there is no image element of the copywriting type having the first specific positional relationship with the image element of the copywriting modification type in the object; and perform, in reference to the mirror center of the object, mirror processing on each image element of the text modification type meeting the mirror condition in the object.

Optionally, the first adjustment module is further configured to: group the image element of the copywriting type and the image element of the copywriting modification type in the object having the first specific positional relationship therebetween into an element group if there is an image element of the copywriting type having the first specific positional relationship with the image element of the copywriting modification type in the object; translate the whole element group from a current position region thereof to a symmetrical position region thereof in reference to the mirror center of the image; separately translate each image element of the text type and each image element of the text modification type not meeting the mirror condition among remaining image elements in the object from a current position region thereof to a symmetrical position region thereof in reference to the mirror center of the object; and perform, in reference to the mirror center of the object, mirror processing on each image element of the text modification type meeting the mirror condition among the remaining image elements.

Optionally, the information includes the type of each image element in the object. The above device may further include a first input module, configured to input each image element in the image into a trained image identification model to acquire an identification result of each image element; and a sixth determination module, configured to determine the type of each image element with reference to the identification result.

Optionally, the first adjustment module is further configured to: identify the object to acquire text content in the object after adjusting the object if the object corresponds to copywriting; determine whether the text content is a commercial marketing term; and if so, display the object on the image in a highlighted manner.

It should be noted herein that the foregoing embodiments provide a schematic structural diagram of the device for image processing. The device can implement the technical solutions described in the foregoing method embodiments. For specific implementation principles and beneficial effects of the above modules or units, reference can be made to the corresponding content in the foregoing method embodiments, which will not be repeated herein.

Figure 4:
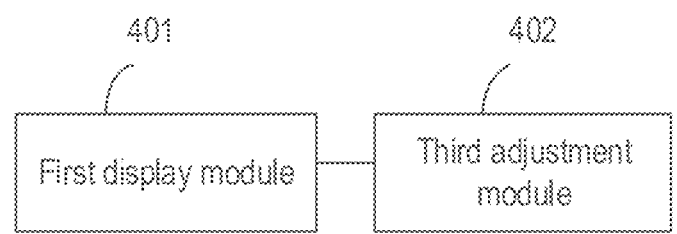
FIG. 4 is a block diagram of a device for image processing according to some embodiments of the disclosure.

FIG. 4 is a block diagram of an electronic apparatus according to some embodiments of the disclosure. As shown in FIG. 3, the device includes the following modules.

In the illustrated embodiment a first display module 401 is configured to display an image on an image processing interface.

In the illustrated embodiment, a third adjustment module 402 is configured to: determine, in response to an adjustment event corresponding to mirror adjustment triggered by a user for the image, an object for adjustment in the image, the object embedded in the image; determine, based on information corresponding to the object, a target adjustment strategy from a mirror strategy and a position translation strategy; and adjust the object in the image based on the target adjustment strategy.

The first display module 401 is further configured to display the adjusted image on the image processing interface.

It should be noted herein that the foregoing embodiments provide a schematic structural diagram of the device for image processing. The device can implement the technical solutions described in the foregoing method embodiments. For specific implementation principles and beneficial effects of the above modules or units, reference can be made to the corresponding content in the foregoing method embodiments, which will not be repeated herein.

Figure 5:
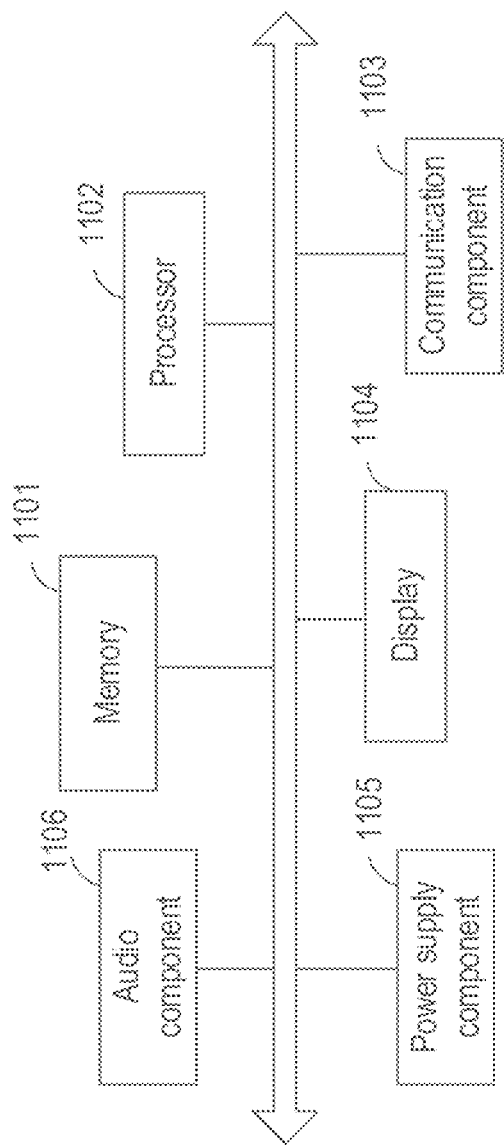
FIG. 5 is a block diagram of a device for image processing according to some embodiments of the disclosure.

FIG. 5 is a block diagram of an electronic apparatus according to some embodiments of the disclosure.

As shown in the figure, the electronic apparatus includes a memory 1101 and a processor 1102. The memory 1101 may be configured to store various other data to support operations on the electronic apparatus. Examples of the data include instructions for any applications or methods operating on the electronic apparatus. The memory 1101 may be implemented by any type of volatile or non-volatile storage apparatus or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The memory 1101 is configured to store a program.

The processor 1102 is coupled to the memory 1101, and is configured to execute the program stored in the memory 1101 to implement the method for image processing according to any one of the foregoing method embodiments.

In addition to the above functions, other functions may be implemented when the processor 1102 executes the program in the memory 1101. For details, reference can be made to the description in the foregoing embodiments.

Further, as shown in FIG. 5, the electronic apparatus further includes: a communication component 1103, a display 1104, a power supply component 1105, an audio component 1106, and other components. FIG. 5 only schematically shows some components, and does not mean that the electronic apparatus includes only the components shown in FIG. 5.

Correspondingly, a computer-readable storage medium storing a computer program is further provided in an embodiment of the present application. When executed by a computer, the computer program can implement the steps or functions of the method for image processing according to any one of the foregoing embodiments.

The device embodiments described above are only schematic. The units described as separate components may or may not be physically separated, and the components displayed as units may or may not be physical units, that is, may be located at the same place, or may be distributed in a plurality of network units. The objective of the solution of this embodiment may be implemented by selecting some or all of the modules according to actual requirements. Those of ordinary skill in the art could understand and implement the present invention without significant efforts.

Through the description of the above implementations, those skilled in the art can clearly understand that the various implementations can be implemented by means of software plus a necessary general hardware platform, and definitely can be implemented by hardware. Based on such understanding, the above technical solution essentially or the portion contributing to the prior art may be embodied in the form of a software product. The computer software product may be stored in a computer readable storage medium, such as a ROM/RAM, a magnetic disk, or an optical disc, and include several instructions that enable a computer apparatus (which may be a personal computer, a server, or a network apparatus) to implement the method in the various embodiments or certain portions of the embodiments.

It should be finally noted that the above embodiments are merely used for illustrating rather than limiting the technical solutions of the present application. Although the present application is described in detail with reference to the foregoing embodiments, those of ordinary skill in the art should understand that the technical solutions recorded in the foregoing embodiments may still be modified or equivalent replacement may be made on partial technical features therein. These modifications or replacements will not make the essence of the corresponding technical solutions be departed from the spirit and scope of the technical solutions in the embodiments of the present application.

What is claimed is:

1. A method for image processing, comprising:
   determining an object in an image, the object embedded in the image;

determining, based on information corresponding to the object, a target adjustment strategy selected from the group consisting of a mirror strategy and position translation strategy, wherein determining the target adjustment strategy comprises using the mirror strategy when the information corresponding to the object meets a mirror condition and using the position translation strategy when the information corresponding to the object does not meet the mirror condition; and adjusting the object in the image based on the target adjustment strategy, wherein adjusting the object comprises translating the object in the image from a current position region to a symmetrical position region in reference to a mirror center of the image when the target adjustment strategy is the position translation strategy.

2. The method of claim 1, wherein adjusting the object in the image further comprises performing mirror processing on the object in the image with reference to a mirror center of the image when the target adjustment strategy is the mirror strategy.

3. The method of claim 1, further comprising performing a layer analysis on the image to acquire layers of the image and selecting the object from the layers.

4. The method of claim 1, wherein the information corresponding to the object comprises a type of each image element in the object, and the method further comprises:
inputting each image element in the image into a trained image identification model to acquire an identification result of each image element; and
determining the type of each image element with reference to the identification result.

5. The method of claim 4, wherein the identification result comprises a layer type and content identification information corresponding to each image element.

6. A non-transitory computer-readable storage medium for tangibly storing computer program instructions capable of being executed by a computer processor, the computer program instructions defining steps of:
determining an object in an image, the object embedded in the image;
determining, based on information corresponding to the object, a target adjustment strategy selected from the group consisting of a mirror strategy and position translation strategy, wherein determining the target adjustment strategy comprises using the mirror strategy when the information corresponding to the object meets a mirror condition and using the position translation strategy when the information corresponding to the object does not meet the mirror condition; and
adjusting the object in the image based on the target adjustment strategy, wherein adjusting the object comprises translating the object in the image from a current position region to a symmetrical position region in reference to a mirror center of the image when the target adjustment strategy is the position translation strategy.

7. The non-transitory computer-readable storage medium of claim 6, wherein adjusting the object in the image further comprises performing mirror processing on the object in the image with reference to a mirror center of the image if the target adjustment strategy is the mirror strategy.

8. The non-transitory computer-readable storage medium of claim 6, the computer program instructions defining further defining a step of performing a layer analysis on the image to acquire layers of the image and selecting the object from the layers.

9. The non-transitory computer-readable storage medium of claim 6, wherein the information corresponding to the object comprises a type of each image element in the object, and the computer program instructions further defining steps of:
inputting each image element in the image into a trained image identification model to acquire an identification result of each image element; and
determining the type of each image element with reference to the identification result.

10. The non-transitory computer-readable storage medium of claim 9, wherein the identification result comprises a layer type and content identification information corresponding to each image element.

11. A device comprising:
a processor; and
a storage medium for tangibly storing thereon program logic for execution by the processor, the program logic comprising:
logic, executed by the processor, for determining an object in an image, the object embedded in the image;
logic, executed by the processor, for determining, based on information corresponding to the object, a target adjustment strategy selected from the group consisting of a mirror strategy and position translation strategy, wherein determining the target adjustment strategy comprises using the mirror strategy when the information corresponding to the object meets a mirror condition and using the position translation strategy when the information corresponding to the object does not meet the mirror condition; and
logic, executed by the processor, for adjusting the object in the image based on the target adjustment strategy, wherein adjusting the object comprises translating the object in the image from a current position region to a symmetrical position region in reference to a mirror center of the image when the target adjustment strategy is the position translation strategy.

12. The device of claim 11, the wherein adjusting the object in the image further comprises performing mirror processing on the object in the image with reference to a mirror center of the image if the target adjustment strategy is the mirror strategy.

13. The device of claim 11, the program logic further comprising logic, executed by the processor, for performing a layer analysis on the image to acquire layers of the image and selecting the object from the layers.

14. The device of claim 11, wherein the information corresponding to the object comprises a type of each image element in the object, and the program logic further comprises:
logic, executed by the processor, for inputting each image element in the image into a trained image identification model to acquire an identification result of each image element; and
logic, executed by the processor, for determining the type of each image element with reference to the identification result.

* * * * *